United States Patent [19]

Mills

[11] Patent Number: 4,710,785
[45] Date of Patent: Dec. 1, 1987

[54] PROCESS CONTROL FOR ELECTROSTATOGRAPHIC MACHINE

[75] Inventor: Borden H. Mills, Webster, N.Y.

[73] Assignee: Eastman Kodak Company, Rochester, N.Y.

[21] Appl. No.: 940,832

[22] Filed: Dec. 12, 1986

[51] Int. Cl.$^4$ ............................................. G01D 15/06
[52] U.S. Cl. ................................ 346/153.1; 355/14 D; 355/14 E; 358/300
[58] Field of Search ................ 346/153.1, 155, 160; 355/14 D, 14 E; 358/300

[56] References Cited

U.S. PATENT DOCUMENTS

| | | | |
|---|---|---|---|
| 3,801,197 | 4/1974 | Akiyama et al. | 355/4 |
| 3,901,592 | 8/1975 | Nepper | 355/4 |
| 3,914,047 | 10/1975 | Hunt et al. | 355/14 C |
| 3,963,344 | 6/1976 | Hujer et al. | 355/35 |
| 4,037,249 | 7/1977 | Pugsley | 358/76 |
| 4,189,742 | 2/1980 | Klopsch | 358/80 |
| 4,215,930 | 8/1980 | Miyakawa et al. | 355/14 D |
| 4,294,536 | 10/1981 | Paxton | 355/14 D |
| 4,294,537 | 10/1981 | Laska et al. | 355/35 |
| 4,391,502 | 7/1983 | Nishikawa | 355/14 D |
| 4,418,358 | 11/1983 | Portsch et al. | 358/80 |
| 4,451,137 | 5/1984 | Farley | 355/14 E |
| 4,486,772 | 12/1984 | Klie et al. | 358/80 |
| 4,516,155 | 5/1985 | Hennig et al. | 358/80 |
| 4,561,016 | 12/1985 | Jung et al. | 358/76 |
| 4,583,186 | 4/1986 | Davis et al. | 358/80 |
| 4,584,601 | 4/1986 | Suzuki et al. | 358/80 |
| 4,647,184 | 3/1987 | Russell et al. | 355/14 E |

Primary Examiner—Peter S. Wong
Assistant Examiner—Jeffrey Sterrett
Attorney, Agent, or Firm—Milton S. Sales

[57] ABSTRACT

An electrostatographic machine is disclosed with at least one adjustable process control parameter. The machine receives and electronically stores electrical image information signals of an original. A reproduction of the original is created using the received electrical image information signal, and a second electrical image information signal is in turn created from the reproduction. The second electrical image information signal is compared with the first electrical image information signal to produce an error signal representative of differences therebetween. The process control parameter is adjusted in response to the error signal to minimize said differences.

5 Claims, 4 Drawing Figures

PROCESS CONTROL FOR ELECTROSTATOGRAPHIC MACHINE

BACKGROUND OF THE INVENTION

1. Field of the Invention

The present invention relates to electostatographic copying and printing machines of the type having electronic imaging, and more particularly to improving the quality of images such machines produce by automatically adjusting process control parameters.

2. Description of the Prior Art

In electrostatographic machines such as printers and copiers, image contrast, density, and color balance can be adjusted by changing certain process control parameters. Such process control parameters most frequently include initial charge $V_0$, exposure $E_0$, and developer bias voltage $V_{bias}$. Other process control parameters which are less frequently used, but which are effective to control the copy contrast, density, and color balance include the concentration of toner in the developer mixture and the image transfer potential.

The existing techniques for regulation of electrostatographic machine process control parameters are either very expensive or user-unfriendly. For example, a test patch or patches may be formed and developed on non-image areas of an image transfer member. The resulting toner densities of the patches are used to control at least some of the process control parameters, but such a system is expensive to build.

Another technique involves operator-adjustable knobs for setting process control parameters. Although less expensive, this technique involves an iterative operator adjustment of several variables, and usually requires multiple test runs. Since the process control parameters are interrelated, their proper adjustment by an operator would require considerable skill and judgement on his or her part.

SUMMARY OF THE INVENTION

Accordingly, it is an object of the present invention to provide an electrostatographic machine with an inexpensive, user-friendly technique for adjusting process control parameters.

In accordance with one aspect of the present invention, an electrostatographic machine is provided with at least one adjustable process control parameter and means for receiving electrical image information signals of an original. The machine includes means for electronically storing the received electrical image information, means for creating a reproduction of the original using the received electrical image information signal, and means for creating a second electrical image information signal from the reproduction. After the second electrical image information signal is created, it is compared with the first electrical image information signal to produce an error signal representative of differences therebetween. Means, responsive to the error signal are provided for adjusting the process control parameter to minimize said differences.

In a preferred embodiment of the present invention, the means for receiving electrical image information signals includes a document scanner, and the means for creating the second electrical image information signal also includes the document scanner. The means for receiving electrical image information signals may also include an image processor for rasterizing received signals.

In accordance with another aspect of the present invention, a method is provided for adjusting at least one process control parameter of an electrostatographic machine. The method includes the steps of receiving electrical image information signals of an original, electronically storing the received electrical image information signal, and creating a reproduction of the original using the received electrical image information signal. A second electrical image information signal is created from the reproduction and is electronically compared with the first electrical image information signal to produce an error signal representative of differences therebetween. Using the error signal, the process control parameter is adjusted to minimize the differences.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Figure 1:
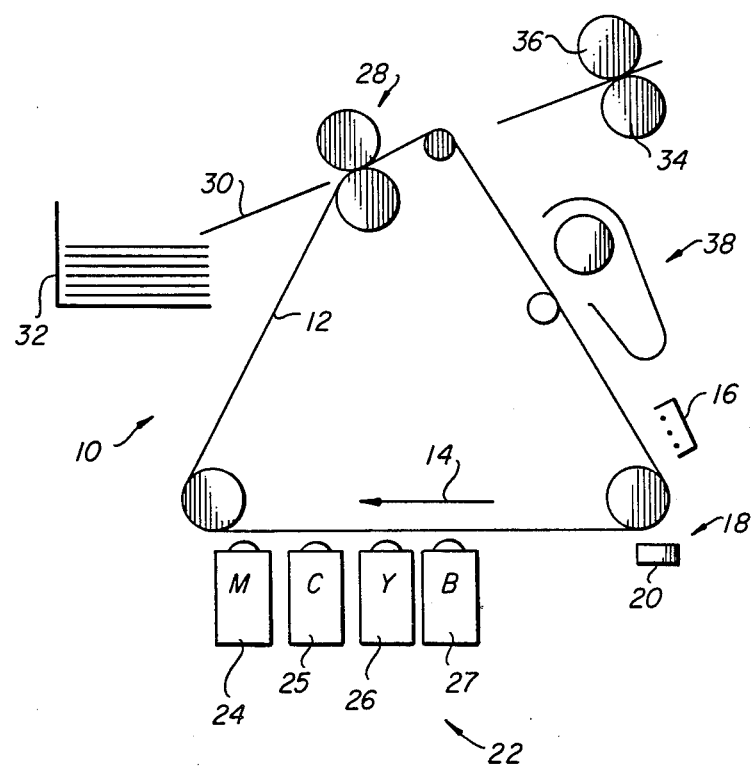
FIG. 1 is a schematic side elevational view of an eletrostatographic machine suitable for the present invention.

Referring to FIG. 1, an electrostatographic machine 10 has an image transfer member such as photoconductive belt 12. Belt 12 is moved in a clockwise direction, as represented by arrow 14.

A charging station 16 applies an electrostatic charge to belt 12. At an exposure station 18, projected light from a write head 20 dissipates the electrostatic charge on the photoconductive belt to form a latent electrostatic image corresponding to the image of an original to be copied or printed. Write head 20 preferable has an array of light emitting diodes (LED's) for exposing the photoconductive belt.

The latent electrostatic image on belt 12 is developed with toner at a developer station 22. The developer station is illustrated as having four separate substations 24, 25, 26, and 27 for processing color images; the substations containing magenta, cyan, yellow, and black toner, respectively. Although four-color capability is illustrated, the present invention is applicable to monochromatic images also.

As the toner image on belt 12 approaches a transfer station 28, an image receiver sheet 30 is fed from a supply 32. After transfer of the toner image to the receiver sheet, the receiver sheet is passed through a pair of heated fuser rollers 34 and 36. Mechanical and electrical cleaning of belt 12 is effected at a cleaning station 38.

IMAGE INFORMATION SOURCE

Figure 2:
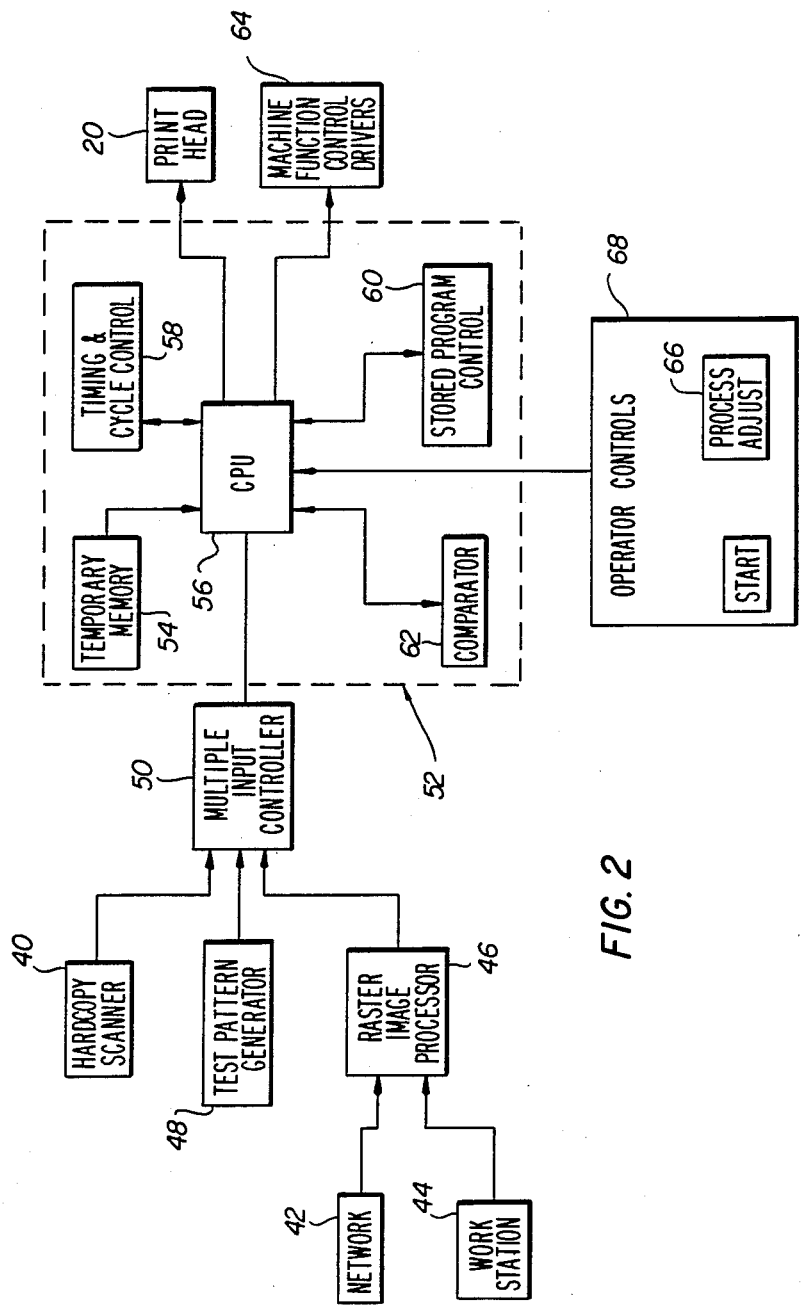
FIG. 2 is a block diagram of the machine shown in FIG. 1, showing a logic and control unit.

Referring to FIG. 2, electrostatographic machine 10 may receive electrical image information signals in any one of several ways. For example, a document scanner 40 optically scans hard copy originals and converts the image to a rasterized electrical signal. Image information may also be obtained from electrical rather than optical sources. That is, electrical image information signals may originate (in so far as electrostatographic machine 10 is concerned) from a computer network 42 or a work station 44. Electrical image information signals from network or work station is rasterized by a raster image processor (RIP) 46. Image information may also come from a test pattern generator 48, to be explained in further detail below. The image signals are applied to write head 20 by a multiple input controller 50 under control of a logic and control unit (LCU) 52.

LOGIC AND CONTROL UNIT (LCU)

Programming of a number of commercially available microprocessors is a conventional skill well understood in the art. The following disclosure is written to enable a programmer having ordinary skill in the art to produce an appropriate control program for a microprocessor. The particular details of any such program would, of course, depend on the architecture of the designated microprocessor.

Referring still to FIG. 2, LCU 52 consists of temporary data storage memory 54, a central processing unit (CPU) 56, a timing and cycle control unit 58, a stored program control 60, and a data comparator 62. Temporary data storage memory 54 may be conveniently provided by a conventional Read/Write memory or Random Access Memory (RAM). Stored program control 60 includes one or more conventional Read Only Memories (ROM) containing operational programs in the form of binary words corresponding to instructions and values. The programs stored in ROM are responsive to various input signals for sequentially actuating and de-actuating the work stations described above with reference to FIG. 1, as well as for controlling the operation of many other machine functions by means of control drivers 64, as disclosed in U.S. Pat. No. 3,914,047. One such machine function controlled by the LCU is the adjustment of the process control parameters $V_0$, $E_0$, $V_{bias}$, etc.

Figure 3:
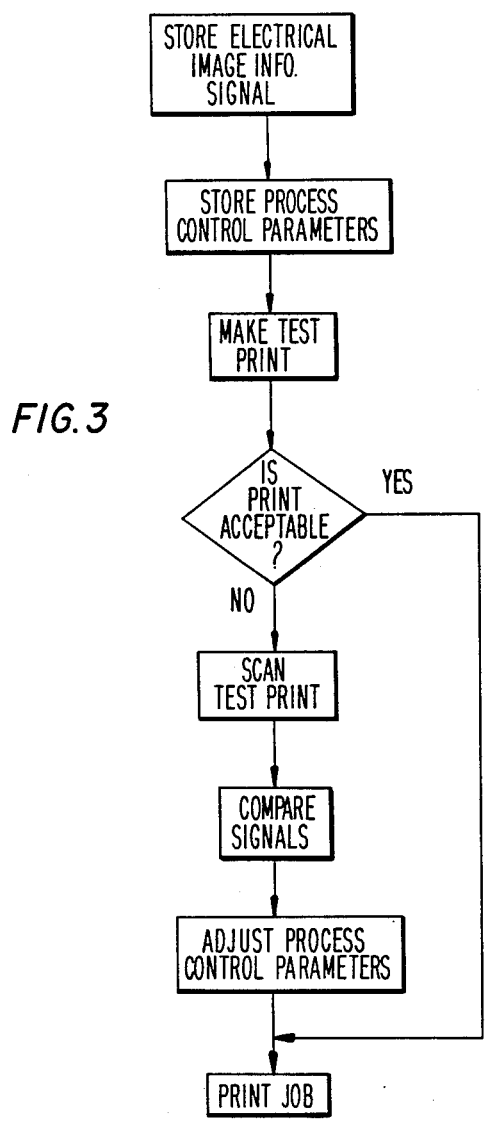
FIG. 3 is a flow chart of the operating of the apparatus of FIG. 1 in accordance with one aspect of the present invention.

Reference is made to FIG. 3, which is a logic flow chart showing the steps for adjusting the process control parameters such that the prints made by the electrostatographic machine closely match those of the original. The operator first operates the machine to make a test print corresponding to an electrical image information signal from scanner 40 or RIP 46, as the case may be. Process control parameter settings used to make the test print, the electrical image information signal, and the identity of the original of a multiple-original document are entered into temporary memory 54 of the LCU. The operator inspects the test print, and proceeds to the next original of the document if the quality of the test print is acceptable in terms of contrast, exposure, and color balance.

If the test print quality is unacceptable, the operator places the test print on the platen of scanner 40 and initiates process control parameter adjustment by pressing a process-adjust button 66 on control panel 68. The test print on the scanner platen is then imaged, and the resultant electrical image information signal is rasterized by RIP 46 and applied to LCU 52.

In comparator 62, the electrical image information signal from the test print is compared to the signal stored in temporary memory 54 from the original corresponding thereto. An error signal created by the comparison is applied to a table lookup ROM in Stored Program Control 60 to generate output signals to be applied to Machine Function Control Output Drivers 64 for adjusting selected process control parameters to compensate for the differences between the original image information signal used to create the test print and the image information signal derived from scanning the test print. These output signals are stored in temporary memory 54 along with the identification of the original.

Once this program has been carried out for each original in the document so that temporary memory 54 contains the image information signal and the process control parameter settings for each original of the document, the print job can be run in full. Each print will be made using the particular process control parameter settings corresponding to the the error signal derived from the test print of that particular original. Alternatively, the process may be carried out for a single, representative original, and the process control parameter settings applied to all originals in the document.

Figure 4:
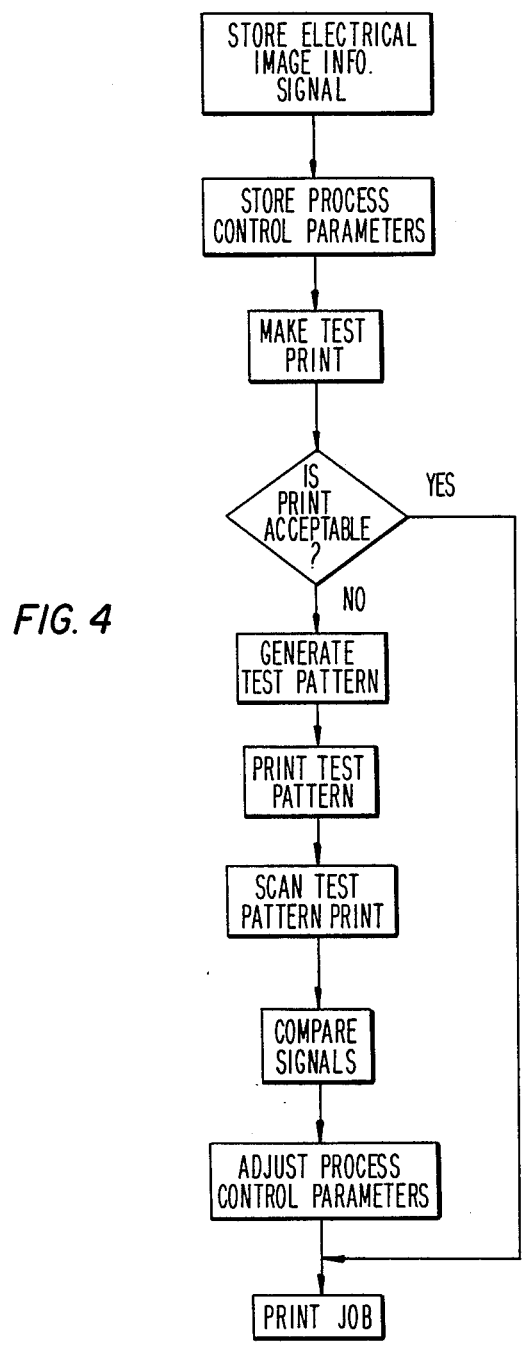
FIG. 4 is a flow chart of the operation of the apparatus of FIG. 1 in accordance with another aspect of the present invention.

FIG. 4 is a logic flow diagram of a second embodiment of the present invention. In this embodiment, the test print is not obtained from an original, but rather from a electrical image information signal from test pattern generator 48. Some documents do not contain sufficient image information to properly adjust the process control parameters. By storing a specially designed color test pattern in generator 48, the operator can designate the generator as the source of the image information signal used to create the test print. Process control parameter settings derived from the test pattern would be used for all prints of the original set.

The invention has been described in detail with particular reference to preferred embodiments thereof, but it will be understood that variations and modifications can be effected within the spirit and scope of the invention.

I claim:

1. In an electrostatographic machine having at least one adjustable process control parameter and means for receiving electrical image information signals of an original; the improvement comprising:

means for electronically storing the received electrical image information signal of an original;

means for creating a reproduction of the original using the received electrical image information signal;

means for creating a second electrical image information signal from said reproduction;

means for comparing said second electrical image information signal with the first electrical image information signal to produce an error signal representative of differences therebetween; and means, responsive to said error signal, for adjusting the process control parameter to minimize said differences.

2. The improvement defined in claim 1 wherein:

the means for receiving electrical image information signals includes a document scanner, and;

said means for creating said second electrical image information signal also includes said document scanner.

3. The improvement defined in claim 1 wherein the means for receiving electrical image information signals includes an image processor for rasterizing received signals.

4. A method for adjusting at least one process control parameter of an electrostatographic machine comprising the steps of:
- receiving electrical image information signals of an original;
- electronically storing the received electrical image information signal of an original;
- creating a reproduction of the original using the received electrical image information signal;
- creating a second electrical image information signal from said reproduction;
- electronically comparing said second electrical image information signal with the first electrical image information signal to produce an error signal representative of differences therebetween; and
- using said error signal to adjust the process control parameter to minimize said differences.

5. The method of claim 4 wherein the step of creating a second electrical image information signal includes the step of optically scanning the reproduction.

* * * * *